Feb. 27, 1962 J. CHUNG 3,023,034
SHAFT BUSHING
Filed July 25, 1960 2 Sheets-Sheet 1
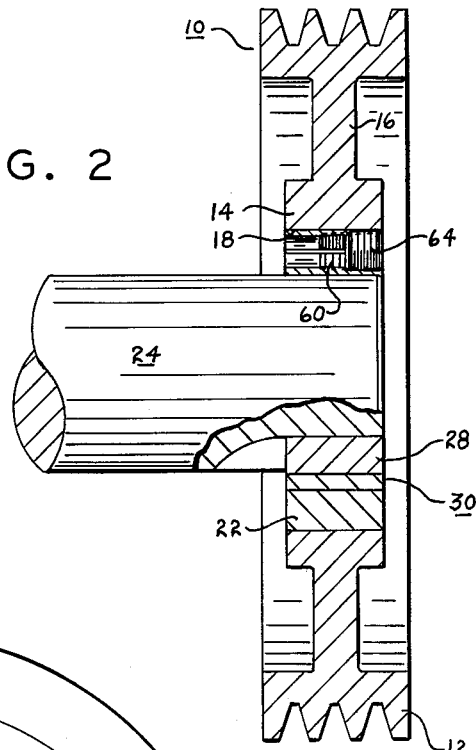
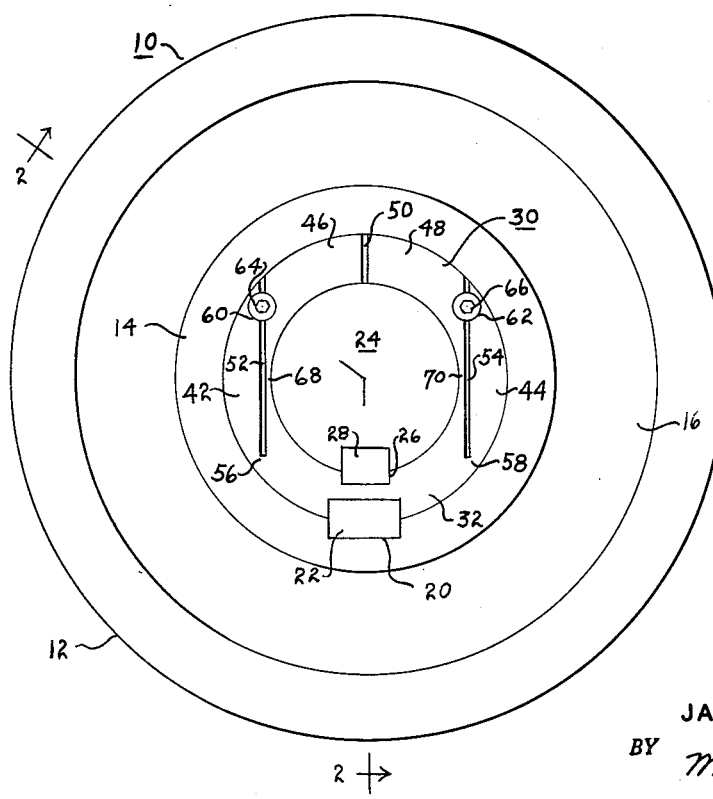
INVENTOR.
JACKSON CHUNG
BY M. A. Hobbs
ATTORNEY Feb. 27, 1962

J. CHUNG 3,023,034

SHAFT BUSHING

Filed July 25, 1960

*INVENTOR.*
JACKSON CHUNG
BY *M. A. Hobbs*

ATTORNEY

United States Patent Office 3,023,034
Patented Feb. 27, 1962

3,023,034
SHAFT BUSHING
Jackson Chung, Mishawaka, Ind., assignor to Dodge Manufacturing Corporation, Mishawaka, Ind., a corporation of Indiana
Filed July 25, 1960, Ser. No. 44,993
9 Claims. (Cl. 287—52)

This invention relates to bushings and more particularly to bushings for mounting sheaves, pulleys, sprockets, couplings and similar machine elements on shafts.

The present commonly employed methods of rigidly mounting sheaves, pulleys and the like on shafts for rotation therewith, involve the use of tapered shafts and hubs, or split tapered bushings either of the single type in which an externally tapered bushing seats in a tapered hub of the machine element or of the double type in which a small externally tapered member seats in a larger internally tapered member. In the latter type the larger member is normally provided with a straight external surface parallel with the shaft for seating on a straight hub of the machine element, and the smaller section is provided with a straight internal surface for gripping the shaft on which the machine element is mounted. In the mounting operation the larger section is expanded to engage the hub and the smaller member is contracted to grip the shaft, by the use of a plurality of screws or bolts which urge the tapered surfaces of the two members together. While these conventional types of tapered bushings of either single or double member construction are satisfactory for most purposes, the various types frequently involve intricate machining operations, are difficult to assemble and mount properly on a shaft, or include parts or elements projecting beyond the hub or body portion of the machine element which in certain installations may be dangerous to the operator or interfere with adjacent parts of the machine. It is therefore one of the primary objects of the present invention to provide a relatively simple compact bushing which can be used with any straight bore hub and shaft and which can easily be fabricated using standard machine tools without involving any intricate machining or assembling operations.

Another object of the invention is to provide a bushing for mounting machine elements of the aforesaid type, consisting principally of a one-piece body portion which is simultaneously contracted to grip the shaft and expanded to engage an internal surface of the machine element by the tightening of two easily reached locking screws, and which is confined completely within the hub of the machine element devoid of any projecting screws, bolts, lugs or bosses.

Still another object of the invention is to provide a bushing of the aforesaid type which can be mounted on a shaft and into the hub of a machine element as a completely assembled unit requiring merely the tightening of a plurality of locking screws all available to the operator from a single side.

A further object is to provide a simultaneously expandable and contractible one-piece bushing for sheaves, couplings, pulleys and the like, which will effectively adapt and adjust itself to the hub of the machine element and the shaft when it is secured in place on the shaft and which will positively and automatically release the hub and shaft when the machine element is being removed from the shaft.

Additional objects of the invention will become apparent from the following description and accompanying drawings, wherein:

FIGURE 1 is a side elevational view of a sheave and my bushing, showing the bushing secured in operating position on a shaft;

FIGURE 2 is a cross sectional view of the sheave and my bushing and a partial cross sectional view of the shaft, the section of the sheave and bushing being taken on line 2—2 of FIGURE 1;

Figure 3:
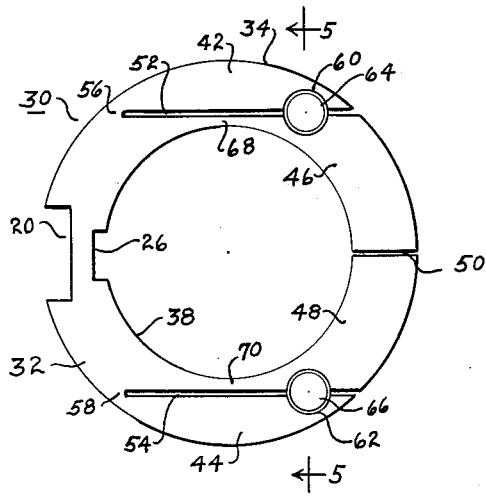
FIGURE 3 is a side elevational view of my coupling removed from the sheave and shaft.
Figure 4:
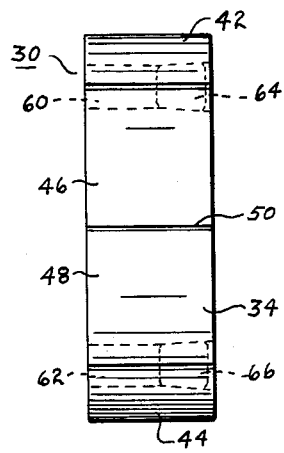
FIGURE 4 is an elevational view of the shaft bushing shown in the preceding figures.
Figure 5:
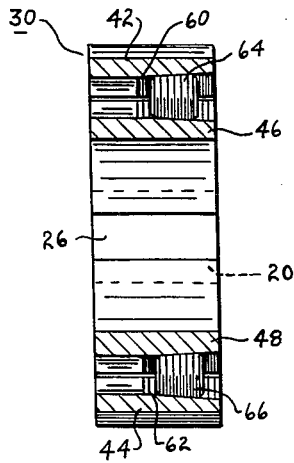
FIGURE 5 is a vertical cross sectional view of the bushing shown in the preceding figures, taken on line 5—5 of FIGURE 3.

Referring more specifically to the drawings wherein are shown two embodiments of the invention which are at present preferred for the purpose of illustration but not of limitation, numeral 10 designates a sheave of the multiple V-belt drive type having a rim 12, hub 14 and disc 16 connected integrally to the hub and rim at the longitudinal center thereof. The hub has a straight cylindrical bore 18 and may be provided with a key-way 20 for receiving a key 22; however, the key-way and key may be omitted in certain installations without interfering with the satisfactory operation of the machine element. Sheave 10 is conventional in construction and design and, as pointed out previously herein, is only one of a number of machine elements having hubs similar to the one shown at numeral 14 with which the present shaft bushing can effectively be used. The sheave is shown mounted on a straight cylindrical shaft 24 and is secured rigidly thereon for rotation therewith by my one-piece, expandable and contractible bushing. The bushing may be provided with a key-way 26 for key 28 to connect the bushing more positively to the shaft.

The present bushing, generally designated by the numeral 30, consists of an annular body member 32 of steel or other suitable material having a longitudinally straight external surface 34 for engaging the wall of bore 18 in sheave hub 14 and a longitudinally straight internal surface 38 for engaging and gripping shaft 24. When bushing 30 is in its unexpanded condition, its outside diameter is preferably such that it will fit snugly in the hub bore without binding and the internal diameter is such that the bushing will slip freely on shaft 24. Whlie the longitudinal length of body member 32 is not important, it is preferable that the member be substantially the same length as the hub so that, when the bushing is mounted in place within the sheave, the two ends will be flush with the respective ends of hub 14.

Body member 32 is divided into four principal segments consisting of two expandable external segments 42 and 44 and two contractible internal segments 46 and 48, by a radial slot 50 extending completely through the body member both from end-to-end and from the external to the internal surfaces, and two lateral slots 52 and 54 extending through the body member from end-to-end and inwardly from one point on external surface 34 to the proximity of another point on the external surface, leaving segments 42 and 44 attached to the main body portion by relatively thin sections of metal 56 and 58, respectively. Slots 52 and 54 extend parallel to each other and to radial slot 50 and may vary in width within limits, whereas radial slot 50 must be sufficiently wide to permit contractible segments 46 and 48 to close around and grip the shaft firmly without completely closing the slot.

In order to expand segments 42 and 44 for contact with the wall of bore 18 and to contract segments 46 and 48 for contact with shaft 24, tapered holes 60 and 62 are placed in slots 52 and 54 near the open ends thereof, but preferably in the radial center of annular body member 32, and are threaded from one end through a major portion of their length, and tapered socket locking screws 64 and 66 are threaded into holes 60 and 62, respectively. When screw 64 is tightened in hole 60 it applies pressure onto the free end segment 42 causing it in effect to pivot on section 56 and move outwardly into engagement with the wall of the hub bore. Simultaneously therewith the screw also applies pressure onto segment 46 causing it to contract, pivoting primarily at the thin section of metal adjacent slot 52 indicated at numeral 68, and to move inwardly into engagement with the shaft. Likewise, when screw 66 is tightened in hole 62, it applies pressure onto the free end of segment 44 causing it to pivot on section 58 and move outwardly into engagement with the wall of the hub bore, and simultaneously applies pressure onto segment 48 causing it to contract, pivoting on the thin section at numeral 70, and to move into engagement with the shaft. In the operation of mounting the sheave on a shaft, the two screws are preferably tightened alternately in short turns in order to equalize the degree of expansion and contraction of segments 42 and 44 and 46 and 48, respectively. While most of the pivotal movement of segments 46 and 48 occurs at the points indicated at numerals 68 and 70, a slight amount of pivotal action also occurs at the point in annular body member 32 opposite slot 50, particularly if the body member contains either or both key-ways 20 and 26.

One of the principal advantages of the present bushing over the conventional tapered bushings previously referred to herein, resides in the simplicity of construction and operation. Since external and internal surfaces 34 and 38, key-ways 20 and 26, and slots 50, 52 and 54 constitute the principal formed features of the bushing, substantially the entire bushing can easily be made without any intricate machining operation. A further important advantage of the bushing is the fact that the entire operation of securing the bushing to the shaft and the sheave to the bushing is accomplished by merely tightening the two screws 64 and 66 and that the inherent resiliency of the metal forming sections 56 and 58 withdraws segments 42 and 44 from the wall of the hub bore and returns them to their fully disengaged position without any external force being required. Likewise the inherent resiliency of the metal forming sections 68 and 70 expands segments 46 and 48, releasing shaft 24 and permitting the bushing to be readily removed therefrom. While body member 32 is shown as a true circle, the external and internal surfaces may be cammed to provide optimum adjustment of the bushing to the shaft and sheave hub.

Figure 6:
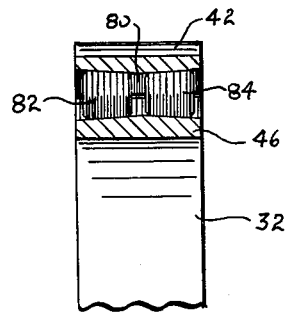
FIGURE 6 is a fragmentary cross sectional view of a modified form of the invention taken on the same sectional line as the view of FIGURE 5.

In some installations complete equalization of pressure at opposite ends of the bushing may be required or desirable. More accurate control in obtaining this equalization is accomplished with the modified form of the invention illustrated in FIGURE 6, in which only one expandable segment and one contractible segment are shown. These parts, being substantially the same as those corresponding parts of the embodiment previously described, are referred to by the same numerals. In this modified form, hole 80 is tapered inwardly from both ends and these two tapered portions of each hole are threaded to receive tapered screws 82 and 84. When the bushing is being mounted on the shaft with the sheave, the screws are tightened intermittently in short turns until the bushing is fully secured to the shaft and the sheave to the bushing. When the sheave is to be removed, the screws are loosened and segments 42, 44, 46 and 48 disengage themselves from the sheave hub and shaft, releasing both the bushing and sheave.

Although only one embodiment of the present bushing and one modified form thereof are described in detail herein, various changes in the construction and design of the bushing may be made without departing from the scope of the invention. For example, the direction of the slots in annular body member 32 may be shifted and the position of holes 60 and 62 may be moved within slots 52 and 54, in order to meet special requirements.

Further, in place of threaded holes 60, 62 and 80 and the corresponding screws, tapered screws and nuts may be used in conjunction with smooth, inwardly tapered holes. The tightening of the screws in the nuts causes the external segments to expand and the internal segments to contract. Additional changes and modifications may be made to suit requirements.

I claim:

1. A one-piece bushing for mounting on a shaft a machine element having a hub with a longitudinal bore, comprising an annular body having an external surface parallel with the wall of the hub bore and an internal surface parallel with the periphery of the shaft, a slot extending through said body, slots on opposite sides of said first mentioned slot extending inwardly from points on said external surface adjacent said first mentioned slot to points adjacent to and spaced inwardly from said external surface and dividing said body into external and internal segments, said body having a hole intersecting each of said second mentioned slots, and means in each of said holes for simultaneously expanding said external segments into contact with the wall of the hub bore and contracting the respective internal segments into contact with the shaft.

2. A bushing for mounting on a shaft a machine element having a hub with a longitudinal bore, comprising an annular body having an external surface parallel with the wall of the hub bore and an internal surface parallel with the axis of the shaft, a radial slot extending through said body from the external surface to the internal surface, and a lateral slot on each side of said radial slot extending inwardly from points on said external surface adjacent said radial slot to points adjacent to and spaced inwardly from said external surface and dividing said body into external and internal segments, and means for simultaneously urging said external segments outwardly and the respective internal segments inwardly.

3. A one-piece bushing for mounting on a shaft a machine element having a hub with a longitudinal bore, comprising an annular body having an external surface parallel with the wall of the hub bore and an internal surface parallel with the periphery of the shaft, a slot extending through said body, slots on opposite sides of said first mentioned slot extending inwardly from points on said external surface adjacent said first mentioned slot to points adjacent to and spaced inwardly from said external surface, said second mentioned slots dividing said body into two external segments and two internal segments, said body having a threaded tapered hole intersecting each of said second mentioned slots and extending inwardly from one end of the bushing, and tapered screws threadedly received in said holes for simultaneously expanding said external segments into contact with the wall of the hub bore and contracting the respective internal segments into contact with the shaft.

4. A bushing for mounting on a shaft a machine element having a hub with a longitudinal bore, comprising an annular body having an external surface parallel with the wall of the hub bore and an internal surface parallel with the axis of the shaft, a slot extending through said body, slots on opposite sides of said first mentioned slot extending inwardly from points on said external surface adjacent said first mentioned slot to points adjacent to and spaced inwardly from said external surface, said second mentioned slots being parallel to each other and equally spaced from said first mentioned slot and dividing said body into external and internal segments, said body having a hole intersecting each of said second mentioned slots, and means in each of said holes for simultaneously expanding said external segments into contact with the wall of the hub bore and contracting the respective internal segments into contact with the shaft.

5. A bushing for mounting on a shaft a machine element having a hub with a longitudinal bore, comprising an annular body having a straight external surface parallel with the wall of the hub bore, a straight internal surface parallel with the axis of the shaft, a slot extending through said body, slots on opposite sides of said first mentioned slot extending inwardly from points on said external surface adjacent said first mentioned slot to points adjacent to and spaced inwardly from said external surface, said second mentioned slots being parallel to each other and equally spaced from said first mentioned slot and dividing said body into two external segments and two internal segments, said body having a threaded tapered hole intersecting each of said second mentioned slots and extending inwardly from one end of the bushing, and tapered screws threadedly received in said holes for simultaneously expanding said external segments into contact with the wall of the hub bore and contracting the respective internal segments into contact with the shaft.

6. A bushing for mounting on a shaft a machine element having a hub with a straight longitudinal bore, comprising an annular body having a straight external surface parallel with the wall of the hub bore and a straight internal surface parallel with the axis of the shaft, a radial slot extending through said body from the external surface to the internal surface, a lateral slot on each side of said radial slot extending inwardly from points on said external surface adjacent said radial slot to points adjacent to and spaced inwardly from said external surface, said lateral slots being parallel to each other and dividing said body into two external segments and two internal segments, said body having a threaded tapered hole intersecting each of said lateral slots and extending inwardly from one end of the bushing, and tapered screws threadedly received in said holes for simultaneously expanding said external segments into contact with the wall of the hub bore and contracting the respective internal segments into contact with the shaft.

7. A bushing for mounting on a shaft a machine element having a hub with a straight longitudinal bore, comprising an annular metal body having a straight external surface parallel with the wall of the hub bore and a straight internal surface parallel with the axis of the shaft, an external and an internal longitudinal key-way in said body, a radial slot extending through said body from the external surface to the internal surface on the side thereof opposite said key-ways, a lateral slot on each side of said radial slot extending inwardly from points on said external surface adjacent said radial slot to points adjacent to and spaced inwardly from said external surface, said lateral slots being parallel to each other and to said radial slot and dividing said body into two external segments and two internal segments, said body having a threaded tapered hole intersecting each of said lateral slots and extending inwardly from one end of the bushing, and tapered screws threadedly received in said holes for simultaneously expanding said external segments into contact with the wall of the hub bore and contracting the respective internal segments into contact with the shaft.

8. A bushing for mounting on a shaft a machine element having a hub with a longitudinal bore, comprising an annular body having an external surface parallel with the wall of the hub bore and an internal surface parallel with the axis of the shaft, a radial slot extending through said body from the external surface to the internal surface, a lateral slot on each side of said radial slot extending inwardly from points on said external surface adjacent said radial slot to points adjacent to and spaced inwardly from said external surface and dividing said body into external and internal segments, said body having a threaded hole intersecting each of said lateral slots and being tapered inwardly from each end of the body, and tapered screws threadedly received in opposite ends of said holes for simultaneously expanding said external segments into contact with the wall of the hub bore and contracting the respective internal segments into contact with the shaft.

9. A bushing for mounting on a shaft a machine element having a hub with a longitudinal bore, comprising an annular body having an external surface parallel with the wall of the hub bore and an internal surface parallel with the periphery of the shaft, a slot extending through said body, slots on opposite sides of said first mentioned slot extending inwardly from points on said external surface adjacent said first mentioned slot to points adjacent to and spaced inwardly from said external surface and dividing said body into external and internal segments, said body having a threaded hole intersecting each of said second mentioned slots and being tapered inwardly from each end of the body, and tapered screws threadedly received in opposite ends of said holes for simultaneously expanding said external segments into contact with the wall of the hub bore and contracting the respective internal segments into contact with the shaft.

References Cited in the file of this patent
UNITED STATES PATENTS

| | | |
|---|---|---|
| 126,183 | Charlton | Apr. 30, 1872 |
| 1,672,601 | Brent | June 5, 1928 |